July 23, 1968 J. SUNNEN 3,393,472
HONING MACHINE
Filed June 24, 1965 10 Sheets-Sheet 1

INVENTOR:
JOSEPH SUNNEN

BY Charles B. Haverstock
ATTORNEY.

July 23, 1968

J. SUNNEN 3,393,472

HONING MACHINE

Filed June 24, 1965

INVENTOR:
JOSEPH SUNNEN
BY Charles B. Haverstock
ATTORNEY.

INVENTOR
JOSEPH SUNNEN
BY Charles B. Haverstock
ATTORNEY

July 23, 1968   J. SUNNEN   3,393,472
HONING MACHINE
Filed June 24, 1965   10 Sheets-Sheet 7

INVENTOR:
JOSEPH SUNNEN
BY Charles R. Haverstock
ATTORNEY.

July 23, 1968 J. SUNNEN 3,393,472
HONING MACHINE
Filed June 24, 1965 10 Sheets-Sheet 10

FIG.15

INVENTOR:
JOSEPH SUNNEN
By Charles B. Haverstock
ATTORNEY

United States Patent Office 3,393,472
Patented July 23, 1968

3,393,472
HONING MACHINE
Joseph Sunnen, 400 S. Warson Road,
Clayton, Mo. 63105
Filed June 24, 1965, Ser. No. 466,535
20 Claims. (Cl. 51—34)

ABSTRACT OF THE DISCLOSURE

A honing machine for honing cylindrical surfaces in work pieces including an overhead control assembly having a portion which extends out over the work piece from which is suspended a rotatable spindle with a honing head including abrasive members mounted on the lower end thereof. The machine includes motor means for rotating the honing head and also for rocking the control assembly to cause the head to move axially up and down during rotation in the work piece, mechanism for radially advancing at least one of the work engaging abrasive members to maintain engagement thereof with the work during honing, means to indicate the load on the motor means in all positions of the head in the work, means to cause the head to dwell at a particular position in the work in order to hone in that position more than in other positions, and controls for stopping a honing operation when the honing diameter of the head has reached a predetermined condition. The subject machine also includes versatile means for supporting a work piece to be honed and mechanisms for predeterminately modifying the stroke movements.

---

The present invention relates generally to honing and abrading machines and like devices and more particularly to a machine for honing cylindrical surfaces.

The art with respect to honing cylindrical surfaces and the like has evolved over a relatively long period of time and many machines and devices are available and used for this purpose. Included are many devices for honing the cylinder walls in engine blocks and like devices. All of the known devices and machines, however, have certain limitations and shortcomings some of which effect their accuracy and versatility. The known devices are also relatively limited as to their operating ranges, are unable to maintain their most desirable operating conditions except within relatively narrow ranges and require experienced operators. Furthermore, the known devices are relatively complicated, cumbersome and expensive and for these and other reasons have been limited to factory and other large use operations but have been relatively unavailable to small installations such as automobile repair and maintenance shops. For these and other reasons the known devices have not been entirely satisfactory and have enjoyed relatively limited use.

The present invention overcomes these and other disadvantages and shortcomings of the prior art by teaching the construction and operation of a relatively inexpensive but highly accurate honing machine which has relatively wide operating range and yet can be operated by persons having relatively little skill and training. The subject machine is also extremely accurate and versatile and can be used to hone in one or more locations in the same or in different members without moving the members. The subject machine, among other things, includes novel means for stroking honing elements, novel means for adjusting the length of the strokes, novel means for adjusting and equalizing the pressure applied by the honing elements in all operating positions thereof, said pressure adjusting and equalizing means including novel means for modifying the stroke pattern, and novel means for automatically terminating a honing operation when predetermined conditions exist. The subject machine also has other features which will be described in detail hereinafter.

It is a principal object of the present invention to provide an improved honing machine.

Another object is to provide more versatile and accurate means for honing cylindrical surfaces and the like.

Another object is to provide means for producing more nearly perfect cylindrical surfaces.

Another object is to provide a honing machine that can be operated with extreme accuracy even by persons having relatively little training and experience.

Another object is to increase the honing range of a honing machine.

Another object is to provide improved stroking means for honing and like machines.

Another object is to provide means for modifying a honing operation to correct for inaccuracies in a surface being honed.

Another object is to provide means for indicating inaccuracies in a surface during honing thereof.

Another object is to expand the market for honing equipment by providing accurate yet relatively inexpensive honing means.

Another object is to provide a homing machine that is particularly adaptable for honing the cylinder walls of engine blocks and like devices.

Another object is to provide improved means for supporting an object being honed.

Another object is to simplify the controls for a honing machine.

Another object is to provide a honing machine that is relatively safe to operate.

These and other objects and advantages of the present invention will become apparent after considering the following detailed specification which covers a preferred embodiment of the subject machine in conjunction with the accompanying drawings, wherein:

Figure 1:
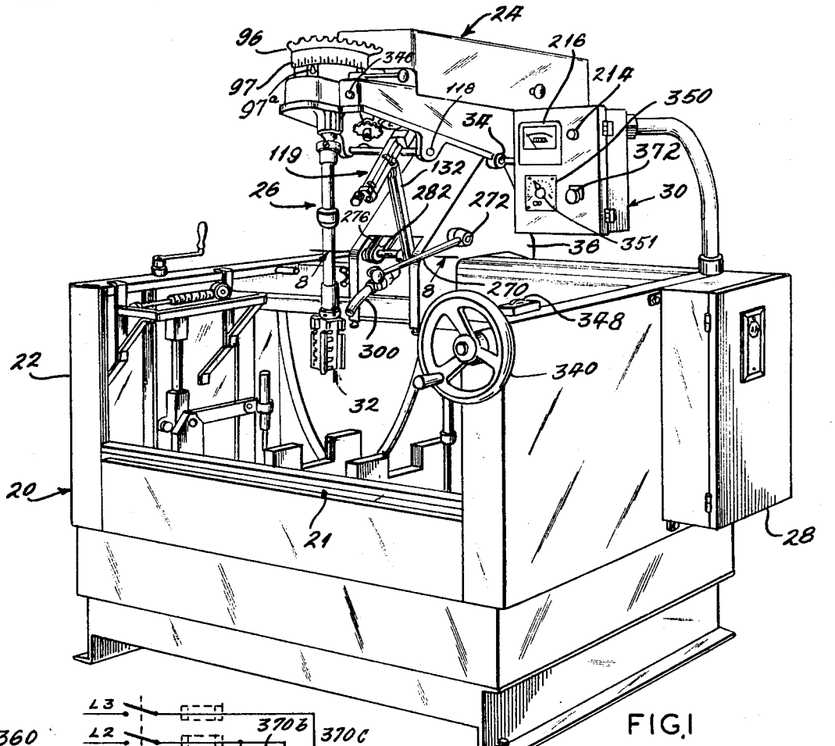
FIG. 1 is a front perspective view of a honing machine constructed according to the present invention.

Referring to the drawings more particularly by reference numbers, number 20 in FIG. 1 refers generally to a honing constructed according to the present invention. The machine 20 includes a base portion 22, a drive arm assembly 24, a rotating drive tube assembly 26, a junction and main control panel 28, and another control panel 30 with suitable switches and other controls for operating the machine. A honing head 32 is attached to the lower end of the drive tube 26 when the machine is in operating condition. Universal connection means are provided between the drive tube 26 and the head 32 and also between the drive tube and the drive arm assembly 24. The head 32 is the portion of the subject machine which engages the work during a honing operation. The head 32 as well as the work piece to be honed can have many different forms including the head forms disclosed in copending Sunnen patent application Ser. No. 349,892 and in Sunnen Patent No. 3,216,155, dated Nov. 9, 1965. The base 22 of the machine can likewise have many different forms and the particular base form selected for showing and describing herein includes means for supporting an engine block or other work piece to be honed, and other means for adjusting the positions of the work and the honing mechanism for the most desirable operating conditions.

The drive arm assembly 24 is pivotally mounted and supported on a shaft 34 located near the top of a movable carriage structure 36. The carriage 36 is horizontally movable along the rear wall of the base 22 for locating the honing head 32 in any desired position along the machine.

Figure 2:
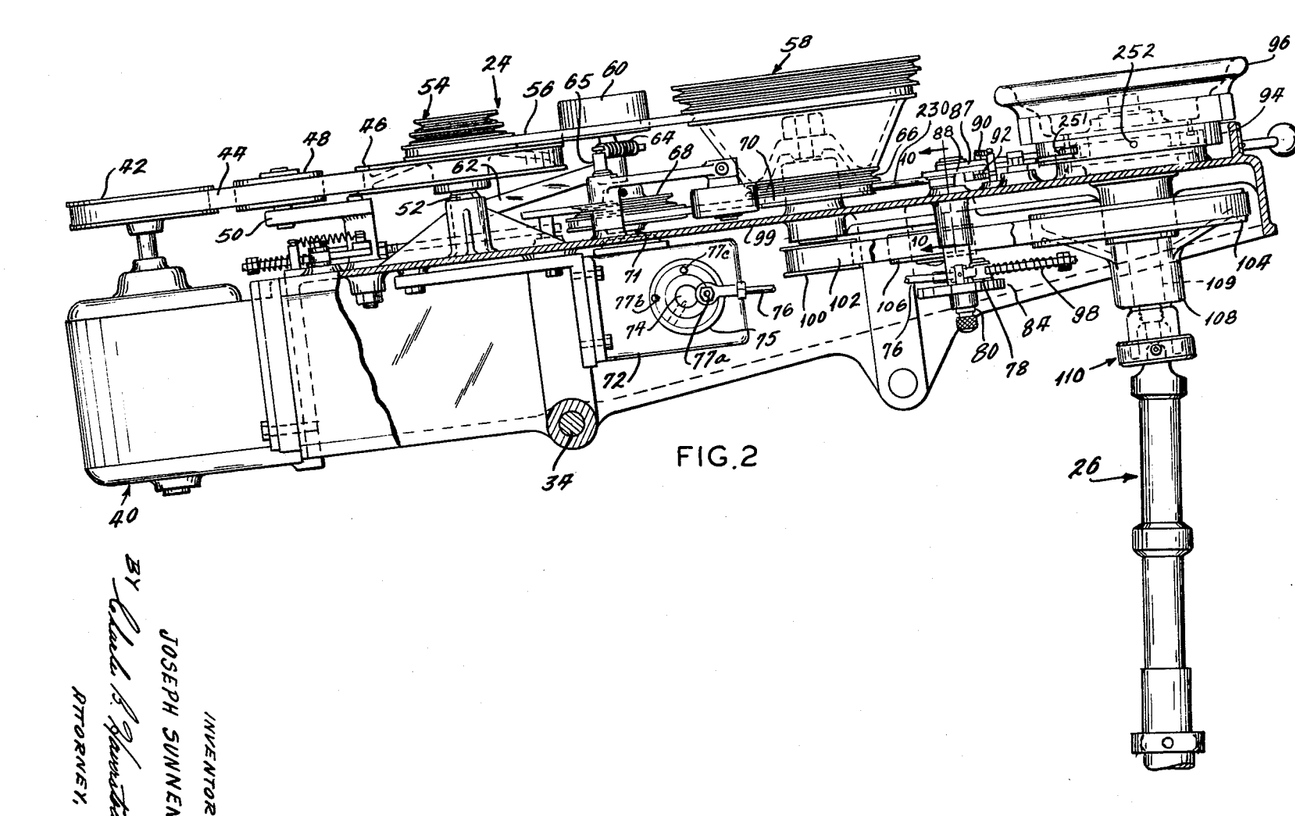
FIG. 2 is an enlarged side elevational view partly in section showing the spindle drive and feed-up mechanism employed on the subject machine.
Figure 3:
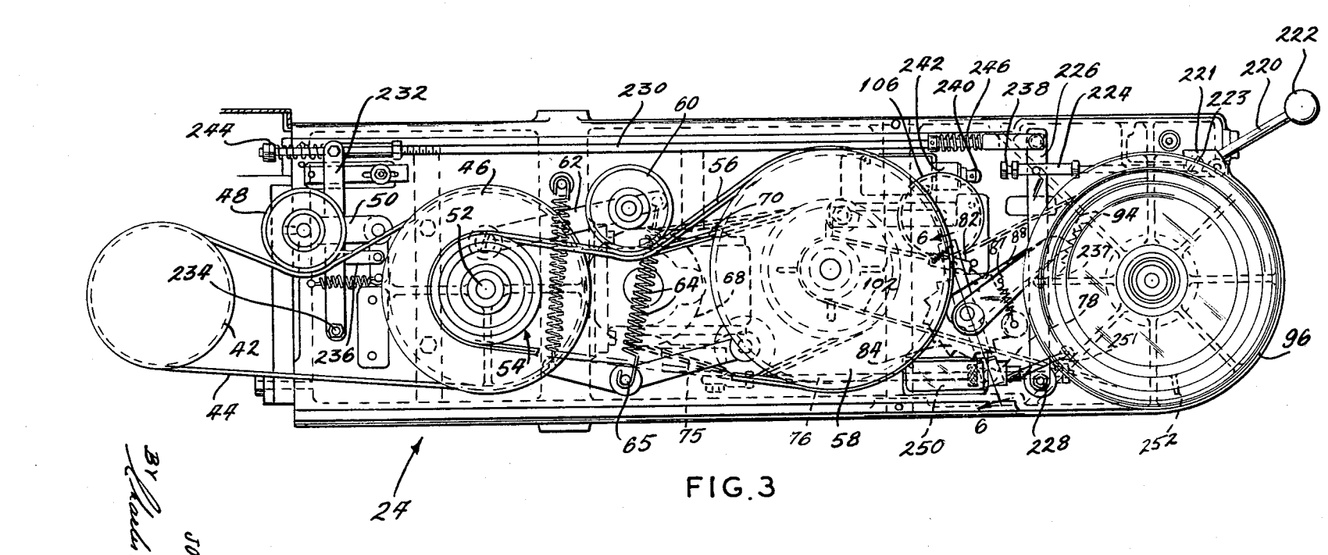
FIG. 3 is a top view of the spindle drive and feed-up mechanism shown in FIG. 2.

FIG. 2 shows part of the mechanism included in the drive arm assembly 24 of the subject machine including the drive means for rotating the head 32 during a honing operation, and the feed-up means employed to expand the honing elements in order to maintain them in engagement with a surface being honed. The drive means include a drive motor 40 with a drive pulley 42 that cooperates with a drive belt 44. The drive belt 44 also cooperates with a driven pulley 46 and with an idler pulley 48 which applies tension thereto. The idler pulley 48 is mounted on an arm 50 as shown in FIGS. 2 and 3, which arm can be adjustable and/or spring biased and can be moved by clutch means between positions tensioning or relaxing the tension on the belt 44 as will be described.

The driven pulley 46 is mounted on a shaft 52 with a multi-positioned V-belt pulley 54, a selected position of which cooperates with a V-belt 56 which extends around another larger diameter multi-positioned pulley 58. The belt 56 is tensioned by an idler pulley 60 mounted on another pivotal arm 62. The tension provided by the idler 60 is produced by a spring 64 which is connected at one end to the arm 62 and at the opposite end to a fixed stud 65.

The pulley 58 has a second smaller diameter multi-position pulley 66 which is operatively connected to another pulley 68 by means of a V-belt 70. The pulley 68 is mounted on one end of a shaft 71 and the opposite end of the shaft 71 drives a gear reducer 72 which has an output shaft 74 that carries a disc member 75. The disc member 75 is pivotally connected off-center to one end of a connecting rod member 76 and rotation of the disc 75 imparts rotational movement to the associated end of the rod 76 causing it to reciprocate. The opposite end of the rod 76 is yieldably connected to a crank arm 78 which is mounted to oscillate back and forth on a shaft 80 due to the motion of the rod 76 (FIGS. 2, 3, 6, 7 and 10). The movements imparted to the arm 78 by the rod 76 can be varied by changing the location on the disc 75 where the rod is connected. Three different rod connection positions 77a, 77b, and 77c at different radii on the disc 75 are shown in FIG. 2. The position selected for use along with the ratchet wheel selected controls the feed-up rate.

The opposite end of the crank arm 78 from its connection to the rod 76 carries a spring biased pawl 82 (FIGS. 3 and 7) which engages teeth formed on a ratchet member 84 fixedly mounted on the shaft 80. It can now be seen that the reciprocating motion imparted to the crank arm 78 will cause the crank arm 78 to oscillate back and forth on the shaft 80 through a fixed angle and in so doing will cause the pawl 82 to move back and forth to engage succeeding teeth on the ratchet member 84. This action also causes the member 84 and the shaft 80 to rotate in periodic steps to produce a feed-up action in the honing head 32 to keep the honing elements engaged under pressure with the work at all times as will be described.

Figures 6, 7, 8, 9, 10:
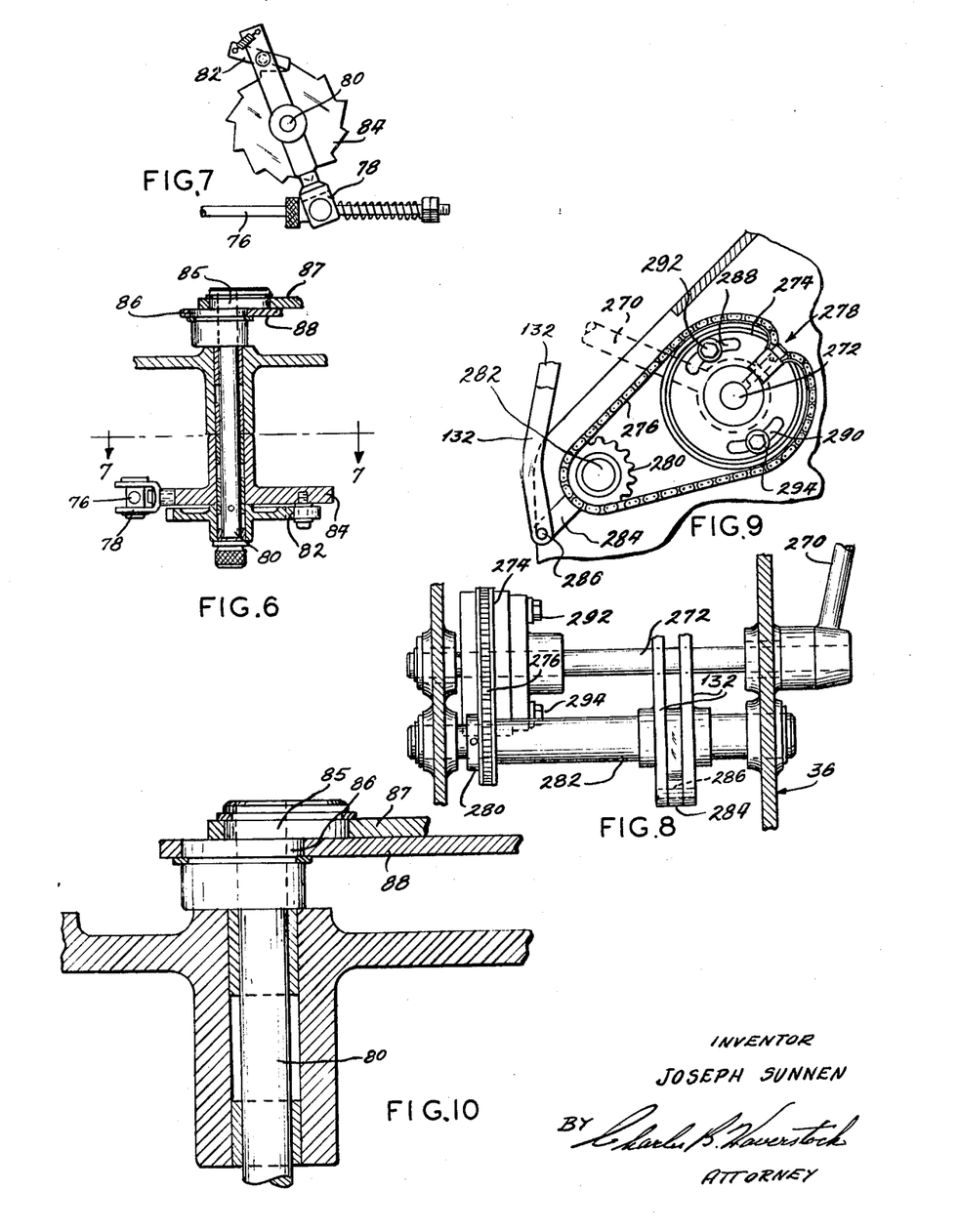
FIG. 6 is an enlarged fragmentary cross-sectional view taken on line 6—6 of FIG. 3.
FIG. 7 is a cross-sectional view taken on line 7—7 of FIG. 6.
FIG. 8 is a fragmentary cross-sectional view taken on line 8—8 of FIG. 1.
FIG. 9 is a fragmentary right side view of the mechanism shown in FIG. 8.
FIG. 10 is an enlarged fragmentary cross-sectional view taken on line 10—10 of FIG. 2.

The feed-up action is produced by a pair of adjacent eccentric elements 85 and 86 which are mounted on the shaft 80 (FIG. 10). The eccentric elements 85 and 86 cooperate respectively with relatively movable stepping pawls 87 and 88 which are biased respectively by springs 90 and 92 into engagement with teeth 94 formed on a rotatable operating member 96 (FIG. 2). Provision is also made to disengage the pawls 87 and 88 from the teeth 94 to release the member 96 and enable it to be rotated in either direction for adjustment purposes. This is so that the operator can retract the feed-up mechanism as well as expand it which can be done at any time. The means for releasing the pawls 87 and 88 will be described later.

When the gear reducer 72 is operating it reciprocates the rod 76 as aforesaid and causes the pawl 82 to rotate the ratchet member 84 and the shaft 80. This action rotates the eccentric members 85 and 86 on the upper end of the shaft 80 and causes the stepping pawls 87 and 88 to move relative to each other and to walk on the teeth 94 of the operating member 96. This in turn rotates the member 96 and produces a feed-up operation which maintains the honing elements engaged with a surface being honed. The connection between the reciprocating rod 76 and the arm 78 is provided with spring means 98 (FIG. 2) that act as an overload protective device. The spring means 98 also maintain a drive connection between the rod 76 and the crank arm 78 during leftward movements thereof. The spring means 98 also relieve excessive pressure and prevent binding or locking up due to an inability of the stepping pawls to rotate the member 96.

The pulleys 58 and 66 are journaled to the frame 99 of the machine by suitable bearing means and are also connected to another smaller diameter pulley 100. The pulley 100 is engaged by belt 102 which extends around a larger diameter pulley 104 also journaled to the frame 99. The pulley 104 is located on the assembly 24 below and in axial alignment with the member 96. Tension is maintained on the belt 102 by means of an idler 106 suitably biased into engagement therewith.

The pulley 104 has a downwardly extending integral portion 108 which is keyed by key 107 to a tubular spindle 109. The lower end of the spindle 109 is connected by a universal connection assembly 110 to the upper end of the drive tube assembly 26, and the upper end of the spindle 109 is connected to a planetary gear assembly 111 which is shown in detail in FIG. 5. The planetary gear assembly 111 is in the feed-up mechanism and controls a feed-up shaft 112 which is operatively connected to the head 32 through suitable universal connections.

Figure 5:
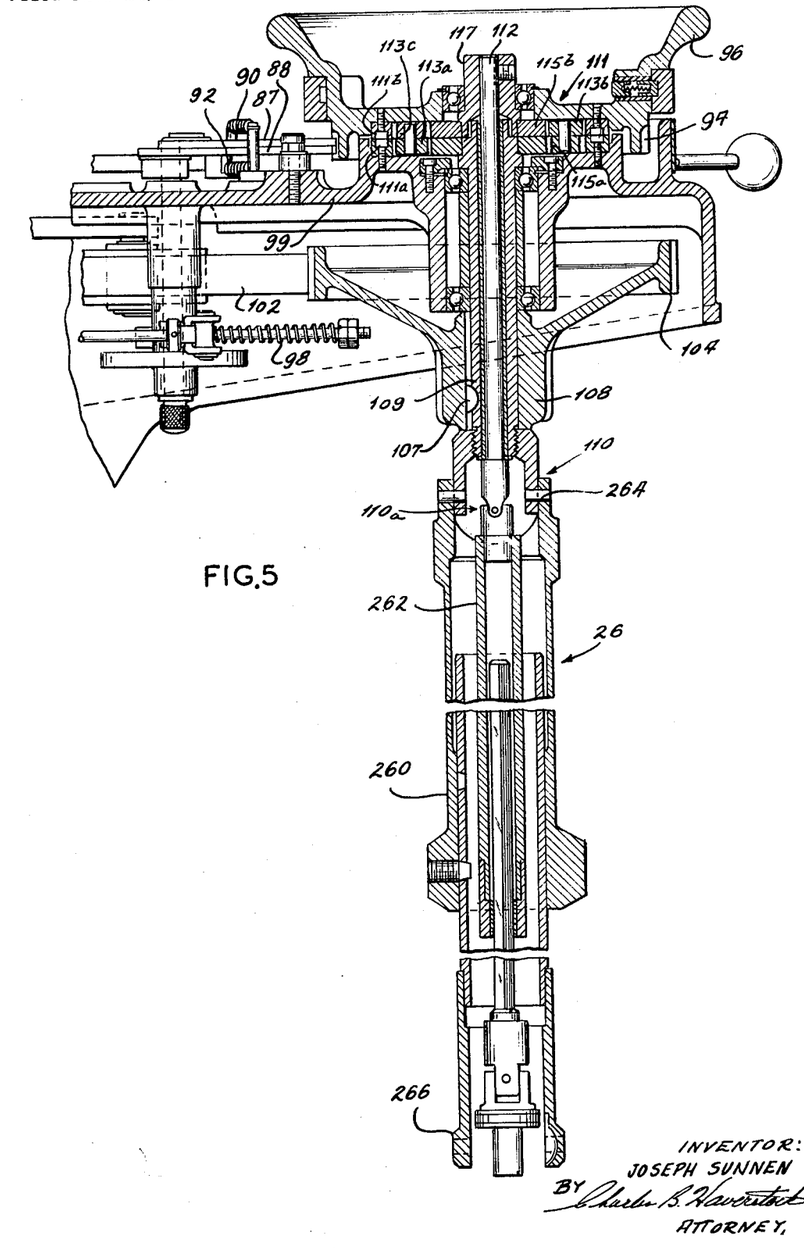
FIG. 5 is an enlarged fragmentary view partly in section showing part of the feed-up and drive mechanism employed on the subject machine.

The planetary gear assembly 111 includes a first ring gear 111a which is fixedly connected to the frame 99 and a second ring gear 111b adjacent thereto which is fixedly connected to the operator member 96. The assembly 111 also includes a plurality of planetary gears 113a and 113b which are rotatably mounted on an annular frame member 113c such that the planetary gears 113a engage the ring gear 111a and the planetary gears 113b engage the ring gear 111b. First and second sun gears 115a and 115b are also provided and respectively engage the opposite inner sides of the planetary gears 113a and 113b. The sun gear 115a is fixedly connected or integral with the spindle 109 and the sun gear 115b is fixedly connected or integral with another member 117 attached to the upper end of the feed-up shaft 112. During operation of the machine the belt 102 drives the spindle 109 and the member 108 which is keyed thereto. The spindle 109 rotates at a relatively constant speed and in so doing also rotates the drive tube 26 and the head 32. Rotation of the spindle 109 also rotates the sun gear 115a and causes the lower planetary gears 113a to roll around the lower ring gear 111a. If the operator member 96 remains in a fixed position the upper planetary gears 113b will rotate around the upper ring gear 111b at the same speed as the lower planetary gears 113a roll around the lower ring gear 111a. This will cause the upper sun gear 115b, the member 117 and the adjustment shaft 112 to also rotate at the same speed as the spindle 109. Under these circumstances no feed-up action will take place. During an actual honing operation, however, the feed-up mechanism will constantly be turning or trying to turn the operator member 96 and in so doing will produce relative movement between the ring gears 111a and 111b. This relative movement will change the relative positions of the feed-up shaft 112 and the spindle 109 in a direction to move the stone assemblies on the head 32 radially outwardly to maintain them engaged with the work in the manner disclosed in copending Sunnen application Ser. No. 349,892 and in Sunnen Patent No. 3,216,155, dated Nov. 9, 1965.

During a honing operation the arm assembly 24 including the spindle 109, the drive tube 26 and the head 32 is alternately moved or reciprocated about the shaft 34. This imparts a stroking motion to the head 32 which causes the head 32 to move up and down in the work. The means for producing this stroking motion are also important to the invention and are shown in detail in FIGS. 1, 2, 4, 11 and 12. It should now be apparent that three basic operations are simultaneously performed by the subject machine during a honing operation including rotating the head at constant speed, expanding the honing diameter of the head to maintain honing pressure on the work, and reciprocating the head to hone all portions of the surface being honed relatively equally.

The drive that produces the stroking action is taken from the output of the speed reducer 72 at the opposite end thereof from the drive for the feed-up mechanism described above. The speed reducer shaft 74 includes means for reciprocating a member 116 (FIGS. 4 and 11) which is mounted for pivotal movement on a shaft 118 journaled to the frame 99. The member 116 is connected to a stroke adjustment assembly 119 which includes means for adjusting the length of the strokes. The stroke adjustment assembly 119 includes a shaft 120, a scale 121 which preferably measures stroke length directly in terms of the length of a bore to be honed, a threaded rotatable member 122, a knob 124 for rotating the thread member 122, and a slide member 126 which is threadedly engaged with the member 122 and slidably engaged with the shaft 120. When the knob 124 is rotated, the slide 126 moves in a selected direction along the shaft 120 to change the stroke length produced by the stroking mechanism. The slide 126 is also pivotally connected to the upper end of a link 132 formed by two spaced bars (FIGS. 1, 4 and 9), and the lower end of the link 132 is pivotally connected to another link which will be described later in connection with FIGS. 8 and 9.

Figure 11:
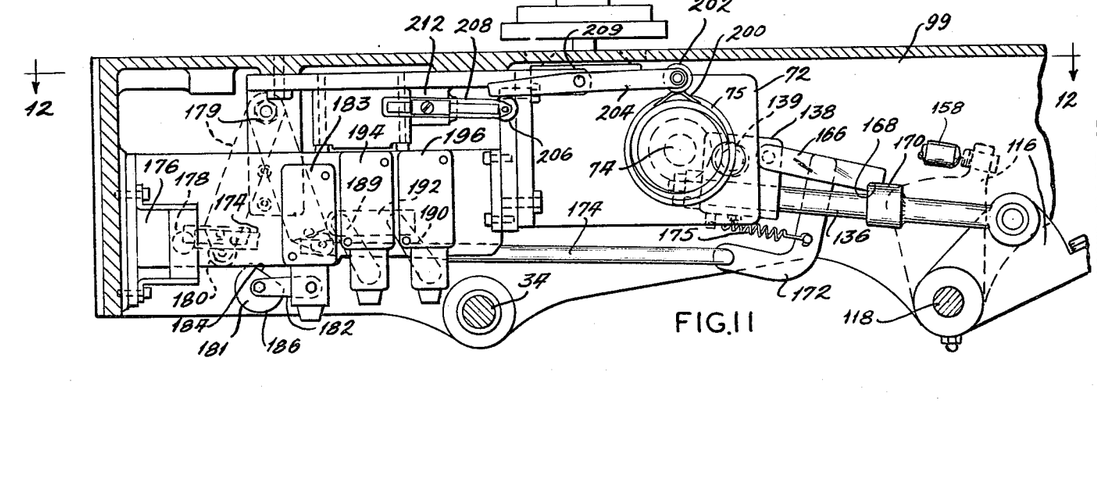
FIG. 11 is an enlarged side elevational view partly in section showing the details of the mechanism in the lower portion of the assembly shown in FIG. 2.
Figure 12:
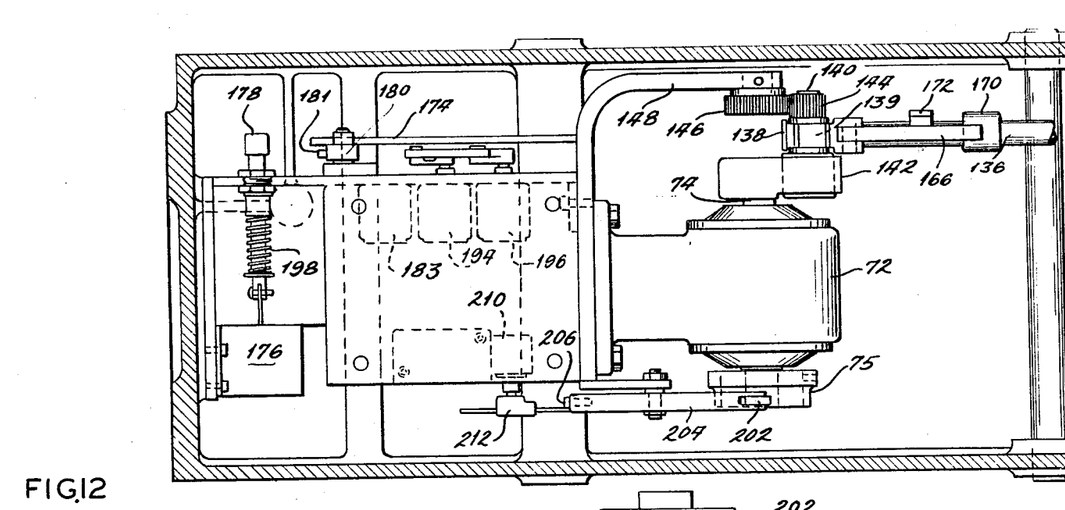
FIG. 12 is a frgmentary cross-sectional view taken on line 12—12 of FIG. 11.

The pivotal member 116 is also pivotally connected to one end of a link 136, the opposite end of which is slidably connected to a follower assembly 138 (FIGS. 11 and 12). The follower assembly 138 is mounted on an eccentric portion 139 of a shaft 140 which is journaled at one end to a rotating member 142 mounted on the speed reducer shaft 74. The opposite end portion of the shaft 140 carries a pinion gear 144 which cooperates with a stationary gear 146 mounted on a fixed arm 148 of the frame 99. During rotation of the member 142, the pinion gear 144 rolls around the gear 146 and in so doing rotates the shaft 140 including the eccentric central portion 139 thereof. This causes the assembly 138 to move on an elliptical or trochoidal path rather than on a circular path and in so doing modifies and improves the stroke pattern. It is also possible to use a circular path which will produce sine wave motion. During operation of the speed reducer 72 a stroke pattern is therefore produced by the rocking motion imparted to the member 116 as aforesaid and this causes the head 32 to move up and down in the work being honed while at the same time the head is being rotated at constant speed.

Figure 4:
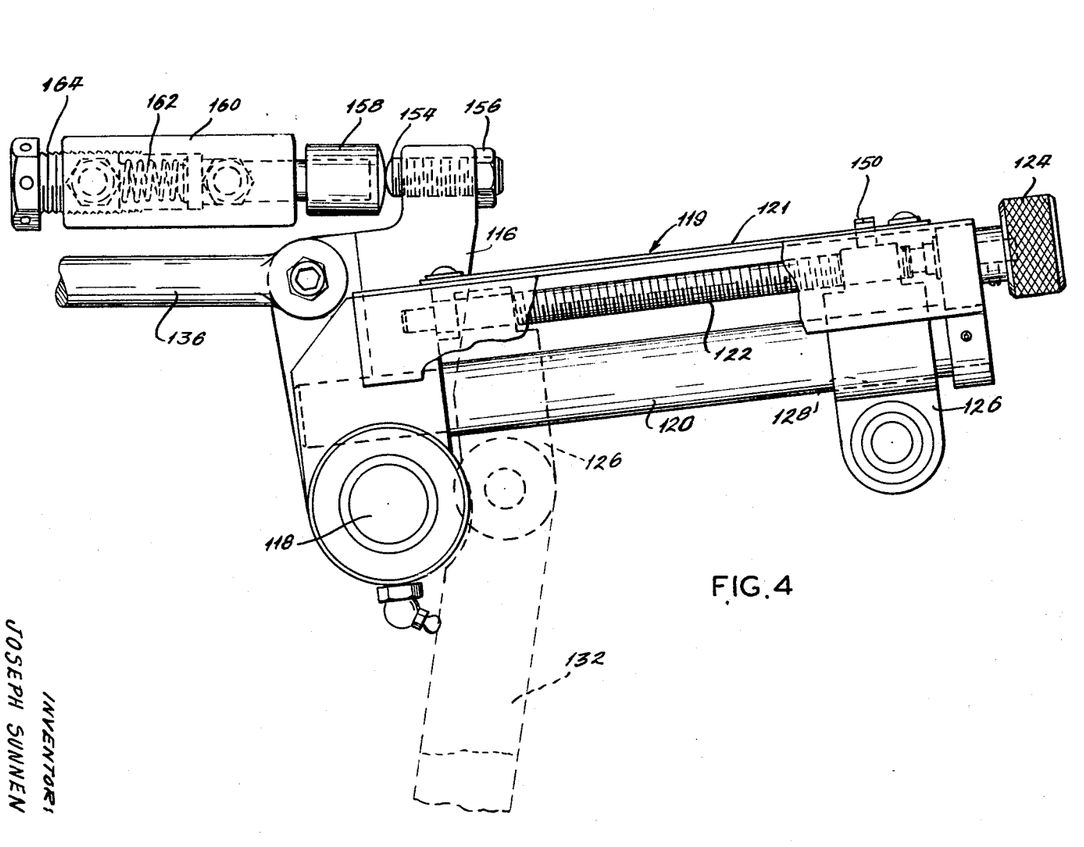
FIG. 4 is an enlarged fragmentary side elevational view of the stroke control and adjustment means employed on the subject machine.

The length of the strokes can be adjusted by moving the slide 126 along the shaft 120 (FIG. 4). For example, when the slide 126 is in the position shown in solid outline in FIG. 4, relatively long strokes will be produced due to the fact that the rocking motion of the member 116 operates over the relatively long distance between the pivot shaft 118 and the connection between the slide 126 and the link 132. When the slide 126 is in the position shown in dotted outline, on the other hand, relative short strokes are produced due to the fact that the same rocking motion of the assembly 119 produces shorter arc movements of the slide 126. This in turn means that the arm assembly 24 will move over much shorter distances. It should also be remembered, that the lower end of the link 132 is pivotally connected to a fixed location during operation of the machine and therefore any pivotal movement of the assembly 119 will cause the arm assembly 24 to move up or down in response to a reaction produced against the lower pivot.

The slide member 126 has a pointer 150 which moves adjacent the scale member 121 during adjustment of the stroke length, and the scale is preferably calibrated to directly read the stroke length in terms of the length of the bore surface to be honed automatically taking into account any overstroke which occurs at the stroke ends due to portions of the stones moving to positions beyond the ends of the surface. The operator therefore does not have to make any calculations to adjust the stroke length but simply has to measure the length of the cylinder to be honed. The actual adjustment is made by rotating the knob 124 in the desired direction until the pointer 150 is opposite the desired bore length indicated on the scale member 121. Regardless of the length of the stroke the frequency of the strokes will remain the same so long as the speed of the gear reducer 72 is not changed. There may, however, be some variation in the instantaneous stroke speed at different times due to the action produced by the rotation of the eccentric center portion 139 of the shaft 140.

Referring to FIG. 4 it can be seen that the member 116 is provided with a threaded adjustable stop 154 which is locked in position by means of lock nut 156. During uninterrupted stroking of the head 32 the stop 154 has no effect on the operation. At certain times, however, it may be desirable to have the head dwell at a certain place in the cylinder because that place has a smaller diameter than other portions of the cylinder. In order to do this, dwell means are provided which cause the head to interrupt its stroking operation for one or more cycles. At such times the stop 154 will move against a resiliently biased plunger member 158 in order to prevent the head 32 from falling when the stroking mechanism is interrupted as will be shown. The plunger 158 is part of a stop assembly 160 mounted on the movable frame 99. The plunger 158 is biased to the rightward in the assembly 160 as shown in FIG. 4 by a spring 162 and the opposite end of the spring engages an adjustable stop 164 threadedly positioned in the assembly 160. The operation of the stop assembly 160 will be described later in connection with the stroke dwell mechanism.

In FIG. 11 means are shown for releasing the stroking mechanism in order to cause the head 32 to dwell at a certain position in the work. The subject machine as disclosed is designed to dwell at the bottom only. A single dwell lasts for one stroke cycle and any number of succeeding dwells can be made to take place on alternate strokes. Dwelling is particularly advantageous when a surface being honed has certain portions that are of smaller diameter than other portions because it enables the reciprocation of the head to be stopped in the smaller diameter portions long enough to remove this irregularity. This feature enables the subject machine to hone much more nearly perfect cylindrical surfaces than has been possible heretofore and also makes the device particularly suitable for honing the cylinder walls of engine blocks which frequently wear unevenly. The means for releasing the stroke mechanism in order for the head to dwell in a particular honing position include a link 166 which is pivotally connected at one end to the follower assembly 138. The opposite end of the link 166 is notched at 168 and the notch 168 cooperates with a collar or enlarged portion 170 on the rod 136. During uninterrupted stroking of the head 32 the notch 168 continuously engages the collar 170 to maintain a rigid connection between the member 116 and the assembly 138. If it is desired to interrupt the stroking for one or more cycle to cause the head 32 to dwell at a particular place, it is only necessary to release the link 166 from the collar 170 thereby preventing a rigid drive connection between the member 116 and the assembly 138. The link 166 is released from the collar 170 by means of another link 172 which is connected thereto. The link 172 is also pivotally connected to a movable rod 174. Under normal stroking, the rod 174 moves axially back and forth being guided during its movements by suitable guide means on the frame 99, and the link 166 is maintained engaged with the collar 170 by spring 175.

To produce a dwell in the stroking operation, an operator member is moved into the path of rearward movement of the rod 174 to stop the rod 174 at a particular place on its rearward stroke. Further rearward movement of assembly 138 thereafter will cause the member 166 to be pivoted upwardly and in so doing releases the link 166 from the collar 170 to free the member 116 as aforesaid. A preferred means for controllably stopping the rearward movement of the rod 174 is solenoid means 176 which when energized moves an armature 178 into the path of the rearwardly moving rod 174.

The movable rod 174 is pivotally connected to a link 179 which is pivoted on the frame 99. The lower end of the link 179 carries a switch actuating roller 180 which engages a spring biased switch actuator member 181 mounted on an operator arm 182 of a switch 183. During rearward movements of the rod 174 the roller 180 will move past and engage a flat 184 formed on one side of actuator member 181 and in so doing will cause the member 181 to rotate slightly but not enough to move the arm 182. The switch 183 will therefore not be actuated on the rearward movements of the rod 174. On the return or forward stroke of the rod 174, however, the roller 180 will engage the rounded outer edge 186 of the actuator 181 which actuator is biased into the position shown in FIG. 11, and in so doing will displace the actuator 181 and the arm 182 downwardly a sufficient distance to actuate the switch 183. Actuation of the switch 183 controls the energizing of the solenoid 176 on the cycle preceding the cycle during which a dwell is to take place and will be explained more in detail in connection with FIG. 16. On the following cycle when the rod 174 again moves rearwardly it will engage the solenoid armature 178 and will cause the link 166 to be lifted from engagement with the collar 170. Thereafter, rotation of the member 142 (FIG. 12) will not be able to move the member 116 because of the telescoping action of the rod 136 in the assembly 138 caused by disengagement of the link 166 and the collar 170. While this disengaged condition exists the rod member 174 will continue to move back and forth but no stroking will take place. Under this condition, however, the rod 174 will be able to move farther in the forward direction than otherwise. In so doing the pivoted link 179 will be able to move against and operate another switch actuating assembly which includes ganged together switch operator members 189 and 190 which are connected by a link 192. When the operators 189 and 190 are moved they actuate associated switches 194 and 196 respectively and in so doing control circuits which deenergize the solenoid 176 and perform other functions. The armature 178 of the deenergized solenoid 176 is then restored by means of spring 198 (FIG. 12) to a position out of the path of the rearward movements of the rod 174. The link member 166 is now able to re-engage collar 170 at the appropriate time in the cycle. It should also be noted that during the dwell cycle the stop 154 is engaged with the plunger 158 to prevent the head from dropping out of the bore and also to retain the head at the proper position.

Operation of the dwell control means can be under control of a manual single dwell control switch which will cause a single dwell cycle for each actuation thereof, it can be made automatic to depend on variations in the load on the head as sensed by a load measuring instrument such as an ammeter or wattmeter, or it can be under control of timer means which can be set to provide any predetermined number of succeeding dwell cycles. The circuits for operating the dwell solenoid 176 as well as the other electrical elements employed will be more fully described in conjunction with FIG. 16.

The rotating member 75 mounted on the gear reducer shaft 74 has a cam portion 200 as shown in FIG. 11 which is engaged during each cycle by a follower roller 202 on the free end of an arm assembly 204. The opposite end of the arm assembly 204 engages a roller 206 mounted on another pivotal arm 208 associated with switch 210 (FIG. 12). When the roller 202 is engaged with the cam 200 as shown in FIG. 11 the arm assembly 204 pivots about shaft 209 and this causes the roller 206 and the arm 208 to move downwardly to actuate the switch 210. The arm 208 is normally spring biased into engagement with the arm 204 and is adjustable by means of a sliding connection with a switch operating assembly 212 to change its operation condition. The switch 210 is actuated once during each rotation of the gear reducer shaft 74 and is provided to energize a panel indicator light 214 to indicate the position of the head 32 at a particular time in each cycle. For example, when the subject machine is used to hone the cylinder walls of engine blocks, the switch 210 will be timed to close and energize the light 214 whenever the head 32 is at the bottom of its stroke. This is done because engine cylinders usually wear less at their bottom ends than at other places and therefore have their smallest diameters at their bottom ends. The control panel may also include a wattmeter, ammeter or other similar load reading meter indicated by number 216 which provides visual indication of the instantaneous power required to drive the head 32 in all positions thereof. The meter 216 also indicates how the power varies and at what points in the cycle the power requirements are greatest and least. If the power requirement is higher when the light 214 is on, this usually means that the cylinder bore being honed is smaller at the bottom end and that the dwell means should be operated to equalize the bore diameter and to straighten the bore. Several different controls are provided for this purpose and will be described in connection with FIG. 16.

To operate the subject machine, two operating members or levers are provided, one of which operates clutch means to apply tension to the motor belt 44 (FIG. 3), and the other to raise or lower the arm assembly 24 including the drive tube 26 and the head 32 between its operating and non-operating positions.

The clutch operating member 220 is mounted on the forward end of the arm assembly 24 and has a handle portion 222. The member 220 is movable between three alternate positions to clutch or declutch the drive means and to start the drive motor 40. In the forward position of the lever 220 the machine is clutched, and in the rearward position it is declutched. The lever 220 is connected to a member 221 which is pivoted to the machine frame at 223. The member 221 is also connected to a rearwardly extending rod assembly 224 which is also pivotally connected adjacent its rear end to a lever arm 226 as shown in FIG. 3. In the forward position of the lever 220, the rod 224 is latched in an overcenter position relative to the pivot means 223. In this position the lever arm 226, which is pivoted to the frame at 228, is in its clockwise position as shown in FIG. 3. The free end of the lever arm 226 is connected to another longer rod 230 which extends rearwardly along the side of the arm assembly 24 and is connected near its rear end to another operating member 232. The member 232 is pivoted to the frame at 234 and is connected by link 236 to the member 50 on which the idler pulley 48 is mounted. In the position shown in FIG. 3 the member 50 is in its most counter-clockwise position, and the idler 48 is applying tension on the motor belt 44 to drive the machine.

The lever 226 carries a stud 237 which is positioned adjacent to the stepping pawls 87 and 88 so that when the member 226 is in its clockwise position the stud 237 will be in a position spaced from the stepping pawls so that their springs 90 and 92 can move them into engagement with the teeth 94 of the member 96. When the operating member 220 is moved to its rear inoperative position, on the other hand, the lever 226 will be in its counter-clockwise position, and in this position the stud 237 will engage the pawls 87 and 88 and have moved them to positions out of engagement with the teeth 94. This will release the feed-up operator member 96 which can now be rotated by hand in either direction to any desired setting. When the pawls 87 and 88 are not released from the teeth 94, however, the operator member 96 can only be turned in one direction.

Figure 16:
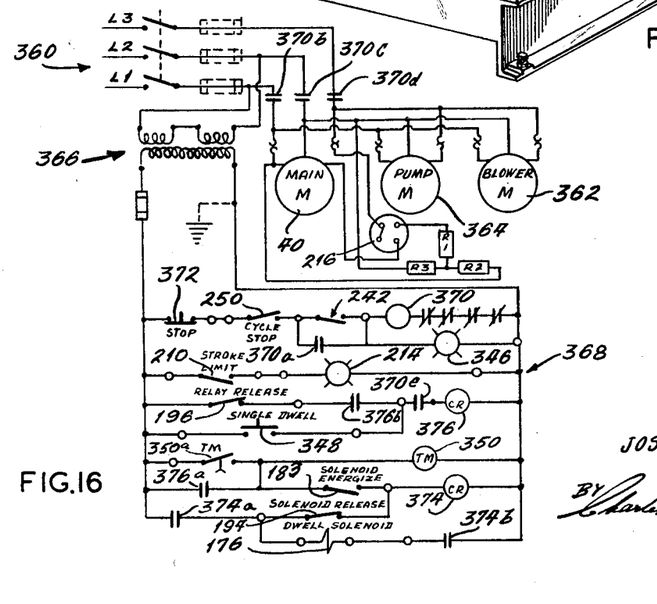
FIG. 16 is a schematic diagram of the electric circuit for the subject machine.

In the forward clutched position of the operating lever 220, a switch actuator member 238 attached to the rear end of the rod 224 is spaced forwardly from a cooperating switch operating member 240 of switch 242. The switch 242 is a normally open switch and closes whenever the lever 220 is moved to its most rearward starting position. The switch 242 is in the motor start circuit as shown in FIG. 16. The clutch rod 230 is also provided with overload springs 244 and 246 for safety reasons.

The operator member 96 which is on the forward end of the arm assembly 24 as already stated is part of the feed-up mechanism employed to expand the honing diameter of the head 32 to maintain the abrasive and other work engaging elements under load. The member 96 has a scale 97 around its periphery (FIG. 1) which is calibrated in terms of feed-up and cooperates with a fixed indicator 97a on the frame 99. When the member 96 is set to a particular position it controls the amount of honing that will be done. This is accomplished by the feed-up mechanism which turns the member 96 as described above. Before commencing a honing operation, when the pawls 87 and 88 are released from the teeth 94, the member 96 is set to a predetermined initial position as determined by the scale 97 and the indicator 97a depending on the amount of stock to be removed. As the stock is thereafter removed the member 96 will rotate from its initial set position until it reaches a final or zero position at which time the machine will automatically be stopped. The automatic stop means include a switch 250 (FIGS. 3 and 16) mounted on the frame 99 and provided with an arm 251 which is actuated by a stud 252 on the member 96 in a predetermined position thereof.

FIG. 5, which has already been described, also shows the details of the drive tube 26 which includes a tubular outer member 260 and a feed-up connecting rod 262 positioned therein. The drive tube and rod 262 are connected at their upper ends, respectively, to the universal connections 110 and 110a, and to the members 109 and 112. At their lower ends the tube 26 is connected to another universal connection means 266 for connecting it to the head 32 and the rod 262 is connected through other connection means to the feed-up adjustment member in the head (not shown). During a honing operation the feed-up connecting rod 262 is rotated by the actions of the feed-up mechanism and operates to expand the honing diameter of the head 32 by moving the honing or guide elements radially outwardly into engagement with the work being honed. Typical honing heads are disclosed as aforesaid in copending Sunnen application Ser. No. 349,892 and in Sunnen Patent No. 3,216,155, dated Nov. 9, 1965.

FIGS. 1, 8 and 9 show means for manually raising and lowering the arm assembly 24 to move the head 32 into and out of a bore. In the raised or inoperative position, the head is spaced above the work and is at a convenient level for making adjustments, replacing the abrasive and other components and doing other maintenance and inspection. In the lower position the head is in a bore. The raising and lowering means are under control of an operating lever 270 mounted on a shaft 272 journaled to the carriage 36. The shaft 272 extends through the carriage and carries an adjustable sprocket member 274 which is engaged by a chain 276 (FIG. 9). The chain 276 is fixedly connected to the sprocket 274 at 278 and extends therefrom around another sprocket 280 mounted on another shaft 282 also journaled to the carriage 36. The shaft 282 has an arm 284 fixedly connected to it, and when the shaft 282 is rotated by moving the lever 270 the arm 284 rotates through a predetermined angle. The free end of the arm 284 is pivotally connected at 286 to the lower end of the link members 132 (FIG. 4) which have their upper ends pivotally connected to the adjustable slide member 126 in the stroke control assembly 119, as aforesaid. When the operator member 270 is in its downward position as shown in FIG. 1, the arm 284 is also in its down position (FIG. 9) and in this position the head 32 is in operative position in the work. The position of the pivot 286 between the members 284 and 132 is fixed during honing and forms a reaction point against which the stroking mechanism operates to produce the stroking motion described above.

When the arm 270 is moved to its upward position it rotates the sprocket 280 and in so doing also rotates the arm 284 and relocates the pivot point 286 at a higher position. This moves the link members 132 and the arm assembly 24 upwardly. The sprocket member 274 is slotted at 288 and 290 (FIG. 9) to enable it to be locked in different adjustment positions by threaded locking means 292 and 294.

FIGS. 1, 13, 14 and 15 show the details of the base portion of the machine which includes the housing 22, lubricant means including a lubricant nozzle 300 connected by suitable means to a pump, and an adjustable platform 302 on which the part or parts to be honed are positioned. The platform 302 is supported at its opposite ends by similar sets of movable support members 304 and 306 (FIG. 13), and the support members 304 and 306 are attached to and supported by the base at pivots 308. The upper ends of the supports 304 are connected by pivots 310 to arm members 312 connected to opposite ends of a horizontal shaft 314 that extends across the rear of the machine. The forward end of the lower horizontal support 306 at one end of the machine is also threadedly connected to a vertical threaded shaft 318 which extends along the adjacent side wall of the housing 22. The upper end of the shaft 318 has a handle 320 which can be rotated to raise or lower the platform 302 to a desired level. This is the usual way to adjust the honing elevation. The horizontal shaft 314 provides a rigid connection between the arms 312 at opposite sides of the machine and enables the elevation adjustments to be made by the single handle 320.

Figure 13:
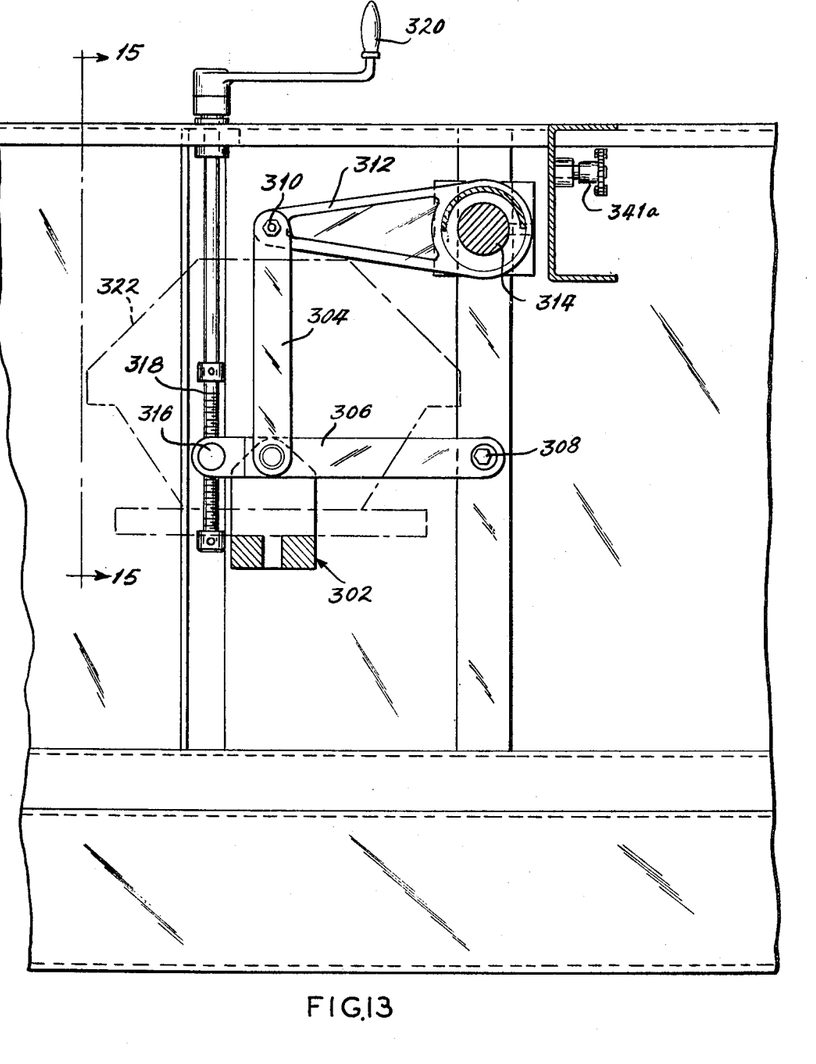
FIG. 13 is a fragmentary view of the interior left side of the base portion of the subject machine as seen in FIG. 1.

The dotted lines in FIG. 13 are the outline of an engine block 322 positioned on the platform 302. The engine block may have many different forms most of which include one or more rows of cylinders to be honed. The cylinders in the different rows are usually at some angle with respect to each other.

Figure 14:
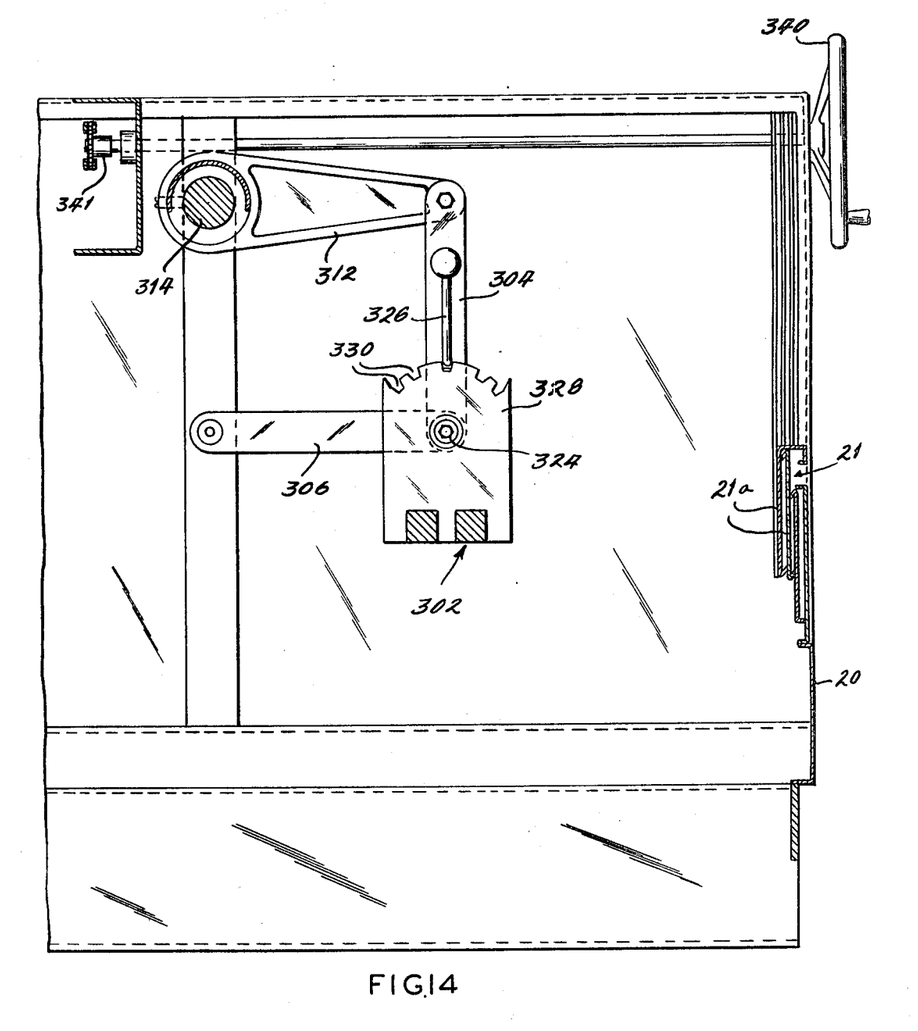
FIG. 14 is a fragmentary view of the interior right side of the base portion.
Figure 15:
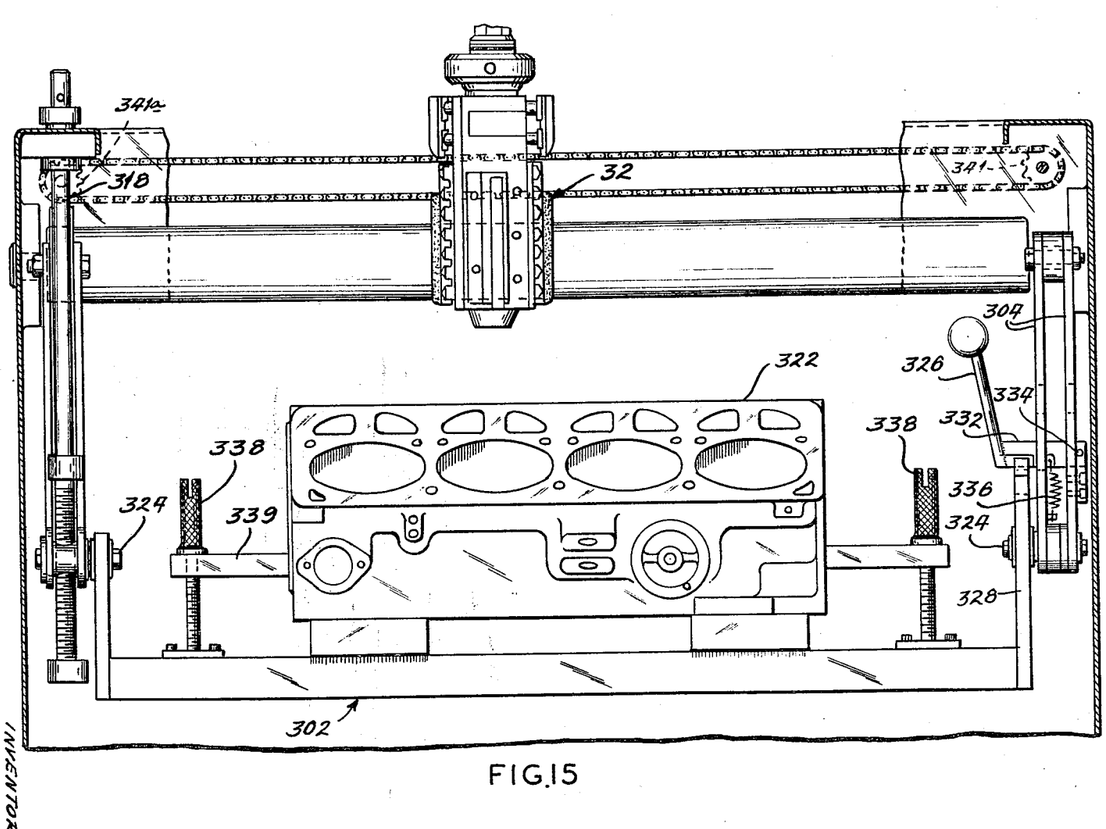
FIG. 15 is a fragmentary cross-sectional view taken on line 15—15 of FIG. 13.

FIG. 14 shows the opposite end of the machine from FIG. 13 which end includes means for tilting the platform 302 about pivots 324 to enable the position of the block 322 to be tilted so that the cylinders in the different rows can be honed without relocating the block on the platform 302. A lever 326 (FIGS. 14 and 15) is provided to lock the platform 302 in its various positions. The lever 326 is pivotally mounted on the support member 304, and the associated end of the platform 302 has a wall member 328 which is provided with a plurality of notches 330 which selectively cooperate with a locking portion 332 of the lever 326. Any one of the notches 330 can be selected to cooperate with the portion 332 to maintain the platform 302 and the work at a desired angular position during honing. This is done so that the cylinders being honed are vertically oriented. Most engine blocks are so constructed that they can be accommodated by providing five notches 330 in the member 328 as shown in FIG. 14. It is possible, however, to provide other setting positions if needed. The operation of the handle 326 is clearly seen in FIG. 15 wherein the notch engaging portion 332 is shown as being pivotal at 334 and as being biased downwardly by means of spring 336. Means are also provided on the platform 302 for anchoring an engine block or other work element thereto. Such means are identified in FIG. 15 as members 338 and 339.

Another operating member of crank 340 (FIGS. 1 and 14) is provided to move the carriage 36 and the arm assembly 24 along the rear of the machine to center the head 32 over a hole to be honed. The crank 340 is mounted on a shaft which has a sprocket 341 on the rear end which cooperates with a continuous link chain which extends across the rear of the machine and around a similar sprocket 341a at the opposite side thereof.

The front wall of the base 22 of the machine is formed by a portion 21 (FIGS. 1 and 14) which is constructed of a plurality of interlocking elongated wall members 21a which cooperate when in raised position to form a closed front panel for the machine. The front panel serves for safety reasons and also to prevent lubricant from being thrown out of the machine when it is operating. When the wall portion 21 is lowered (FIG. 14) considerable access is provided into the machine.

Most of the operating controls for the machine are mounted on the auxiliary control panel 30. These include the wattmeter 216 or other load indicating means which provide a visual indication of the instantaneous power required to rotate the head 32. The power will vary if the surface being honed has different diameter or different hardness portions and for other reasons as well. The meter 216 is also used in conjunction with the dwell control means to make the head dwell in smaller diameter portions of the bore as aforesaid. When the meter reading is relatively constant as indicated by a steady needle it means that the bore is straight or uniform in diameter. Another indicator light 346 is mounted on the front end of the arm assembly 24 to indicate when the machine is on. A single dwell control switch 348 is mounted on the right side wall on the base (FIG. 1) and when momentarily depressed will produce a single dwell operation. If the single dwell switch 348 is held down, however, it can be used to produce any desired number of succeeding dwells on alternate cycles. An adjustable timer device 350 is also mounted on the panel 30 and is provided with a movable pointer 351 which can be set to produce a particular number of succeeding dwell cycles. The scale on the timer 350 is preferably calibrated to directly read any number of dwell cycles within the range thereof. Experience will enable an operator to be able to accurately set the timer 350 depending on the variation indicated by the fluctuations in the meter 216.

FIG. 16 shows a typical circuit for the subject machine. The circuit includes a power supply portion designated generally by number 360. The power supply portion 360 is fused by suitable fuses and is also controlled by suitable means to supply energy for operating a blower motor 362, a lubricant pump motor 364, and the main drive motor 40. The circuit also includes a transformer 366 which supplies power for operating the various controls for the machine including those already described. Most of the electrical controls for the subject device are mounted in the panel boxes 28 and 30. The control circuits are indicated generally by number 368 and receive their power from the secondary winding of the transformer 366.

The control circuit for the motors includes a motor relay 370 which is energized when the start switch 242 is actuated by operating the lever 220. The motor relay 370 is in a circuit with normally closed overload switches, and when energized its various contacts close. The motor relay 370 has its own normally open hold contacts 370a which close when it is energized to maintain the relay energized. The contacts 370a are also used to energize the on-off indicator light 346. As long as the motors are on the indicator light 346 will remain energized. The motor relay has other contacts 370b, 370c and 370d in the power supply circuit 360 which control the energizing and de-energizing of the motors 40, 362 and 364.

The normally closed cycle stop switch 250 is connected in the motor relay circuit and opens at the conclusion of a honing operation under control of the stud 252 on the member 96. A manual stop switch 372 is also provided in the motor relay circuit to stop the machine at any time.

The dwell solenoid 176 is connected in a circuit with two normally open relay contacts 374a and 374b of a control relay 374. The relay 374 must be energized to produce a dwell and the circuit for energizing the relay 374 includes the switch 183 and normally open relay contacts 376a of a single dwell control relay 376. The relay 376 is energized when the single dwell control switch 348 is depressed. Motor relay contacts 370e are also in this circuit and are closed when the motors are energized. The single dwell control relay 376 is held energized during a dwell operation by its own hold contacts 376b which are in series with the normally closed relay release switch 196 which, as described above, is actuated by predetermined movements of the rod 174, see FIG. 11. When the single dwell switch 348 is closed and energizes the single dwell relay 376 a circuit is established which enables the control relay 374 to also be energized as soon as the solenoid energizing switch 183 is closed by the roller 180. When this happens relay contacts 374a and 374b close and enable the dwell solenoid 176 to be energized. Thereafter when the switch 196 opens it deenergizes relay 376 and in turn prevents the reenergizing of the relay 374 on the succeeding cycle. Note also that the hold circuit for the relay 374 includes the normally closed switch 194 which switch is ganged to operate with a switch 196. This means that the relay 374 will be deenergized simultaneously with relay 376.

If it is desired to produce a predetermined number of succeeding dwell cycles, the timer 350 is set so that its contacts 350a remain closed for the required time. This keeps the control relay 374 energized through a circuit which includes contacts 350a and the switch 183. The timer contacts 350a are in parallel with the control relay contact 376a and therefore provide an alternate circuit for energizing the relay 374.

Thus there has been shown and described a novel honing machine and the controls therefor which fulfill all of the objects and advantages sought therefor. Many changes, modifications, alternations, variations and other uses and applications of the subject machine will, however, become apparent to those skilled in the art after considering the subject disclosure and the accompanying drawings. All such changes, modifications, alterations, variations and other uses and applications which do not depart from the spirit and scope of the invention are deemed to be covered by the invention which is limited only by the claims which follow.

What is claimed is:

1. A honing machine for honing cylindrical surfaces including means for supporting an object having a cylindrical surface to be honed, and means for honing the cylindrical surface including a honing head having at least one abrasive member thereon engageable with the surface being honed, means for rotating the honing head during a honing operation, means for simultaneously axially moving the honing head in a stroking motion, and means for interrupting the stroking motion to cause the rotating honing head to dwell at a predetermined position for a predetermined time interval.

2. A honing machine for honing cylindrical surfaces in work pieces comprising means for supporting a work piece having a surface to be honed, a honing head including at least one abrasive member movable on the surface to be honed, means for rotating the honing head, means for expanding the honing diameter of the honing head to maintain the abrasive member engaged with the surface during a honing operation, means for imparting a stroking motion to the head during a honing operation to hone all portions of the surface means for interrupting the stroking motion to cause the head to dwell at a certain place on the surface being honed for a predetermined time in order to hone that portion more than other portions, and means automatically stopping a honing operation after a predetermined amount of material has been removed from the surface, said last named means including means responsive to predetermined expansion of the honing diameter of the honing head.

3. The honing machine defined in claim 2 wherein said head is supported in a substantially freely suspended position for honing substantially vertically oriented cylindrical surfaces.

4. The honing machine defined in claim 2 wherein means responsive to the power required to rotate the honing head are provided, said means including means to visually indicate the instantaneous power required at all times and in all positions of the head.

5. The honing machine defined in claim 2 wherein means are provided to adjust the head travel produced by the stroking means.

6. Means for honing cylindrical surfaces comprising a honing machine including means for supporting work having a cylindrical surface to be honed, means for honing the cylindrical surface including a honing head having at least one honing element and at least one guide element, means for rotating said honing head in the work, means simultaneously maintaining the abrasive element and the guide engaged with the cylindrical work surface during honing thereof, said last named means including feed-up means for expanding the honing diameter of the head and means to maintain the surface engaging elements under predetermined pressure against the work, other means for imparting a reciprocating movement to the honing head, and means to cause the honing head to dwell in a predetermined operating position in the work to cause the head to hone in said position more than in other operating positions thereof.

7. The honing means defined in claim 6 wherein said feed-up means include means for stopping a honing operation after a predetermined amount of stock has been removed from a surface being honed, said stopping means including means responsive to predetermined radial movement of the honing element.

8. The honing means defined in claim 6 wherein said head reciprocating means includes a pivotal assembly for supporting the honing head, and means for rocking said pivotal assembly to impart reciprocating motion to the head.

9. The honing means defined in claim 6 wherein means are provided for modifying the movement imparted to the honing head by the reciprocating means, said means including eccentric means operatively connected to the reciprocating means.

10. A honing machine for honing cylindrical surfaces in work pieces comprising means for supporting a work piece having a cylindrical surface to be honed, means for vertically orienting the axis of the cylindrical surface, a honing control assembly having a portion extending over the cylindrical surface to be honed, means supporting said control assembly for pivotal movement whereby the portion of said assembly that extends over the surface to be honed moves substantially vertically relative to said surface, means suspended from said control assembly including a honing head having three surface engaging elements thereon which determine the honing diameter thereof, means for moving the honing head between an inoperative position spaced above the work piece and an operative position in which the surface engaging elements are engaged with the cylindrical surface to be honed, means for rotating the honing head, other means for moving one of said surface engaging elements radially to change the honing diameter and to maintain the surface engaging elements engaged with the surface being honed during rotation thereof, means for imparting reciprocating pivotal movement to the control assembly and stroking movement to the honing head to continuously change the position thereof relative to the surface being honed, means responsive to the energy required to rotate the honing head including means to provide a continuous indication thereof, means for temporarily interrupting the stroking movement of the head to cause the head to dwell for a determinable time at a particular operating position, and means to terminate a honing operation whenever the said one surface engaging element has been moved radially on the head by a predetermined amount.

11. The honing machine defined in claim 10 wherein means are provided to cause a plurality of succeeding interruptions of the stroking movement.

12. The honing machine defined in claim 10 including means for adjusting the length of the stroke movements of the honing head.

13. The honing machine defined in claim 10 wherein said means for imparting a stroking movement to the honing head includes first means for reciprocating the head to produce a back and forth movement and second means for modifying the movements produced by the first means.

14. The honing machine defined in claim 10 wherein the means for supporting a work piece to be honed include a platform, means securing the work piece thereto, and means for adjusting the position of the platform and the work piece thereon.

15. The honing machine defined in claim 14 wherein said work piece supporting means include means for tilting the work piece.

16. Honing means comprising a honing control assembly, means supporting the control assembly for pivotal movement about a pivot axis, means for suspending a honing device from the control assembly at a location thereon spaced from the pivot axis, said honing device having at least one radially movable work engaging element thereon, said control assembly including motor drive means and first means under control of the drive means for rotating the honing head, second means under control of the drive means for radially moving said one work engaging element to expand the honing diameter of the honing device and to maintain the work engaging element engaged with the work during a honing operation, and third means under control of the drive means for predeterminately angularly moving the control assembly back and forth about the pivot axis to impart a stroking motion to the honing head, and means for selectively clutching or declutching the motor drive means.

17. The honing means defined in claim 16 wherein means are provided to interrupt the operation of the said third means to cause the honing device to dwell for a predetermined time in a predetermined operating position.

18. The honing means defined in claim 16 wherein means are provided to indicate whenever the honing device is in a predetermined position in its stroking motion.

19. The honing means defined in claim 16 wherein means are provided to modify the stroking movement imparted to the honing device by the third means.

20. The honing machine defined in claim 16 wherein means are provided to control the amount of radial movement of the said radially movable honing element.

References Cited

UNITED STATES PATENTS

| | | | |
|---|---|---|---|
| 2,129,049 | 9/1938 | Doran | 90—21 |
| 2,130,393 | 9/1938 | Johnson | 51—34 |
| 2,255,583 | 9/1941 | Holland | 51—34 |
| 2,284,325 | 5/1942 | Kline | 51—34 |
| 2,381,572 | 8/1945 | Caldwell | 51—34 |
| 2,777,257 | 1/1957 | Johnson | 51—34 |
| 2,833,089 | 5/1958 | Beauloye | 51—165 X |
| 3,025,642 | 3/1962 | Swanson | 51—34 |
| 3,216,155 | 11/1965 | Sunnen | 51—347 |
| 3,287,860 | 11/1966 | Blake | 51—34 X |
| 3,324,602 | 6/1967 | Wright | 51—34 X |

LESTER M. SWINGLE, *Primary Examiner.*